Figure 1:
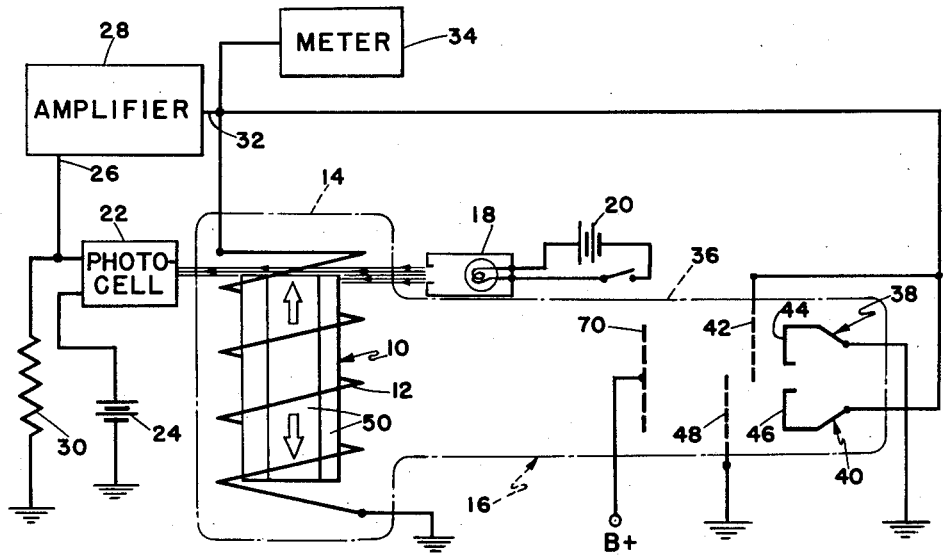

July 31, 1962  J. J. MORGAN  3,046,792
ACCELEROMETER WITH VELOCITY AND DISTANCE INTEGRATING MEANS
Filed Dec. 5, 1958

INVENTOR.
JAMES J. MORGAN
BY
Knox & Knox

United States Patent Office 3,046,792
Patented July 31, 1962

3,046,792
ACCELEROMETER WITH VELOCITY AND DISTANCE INTEGRATING MEANS
James J. Morgan, Box 296B, Del Mar, Calif.
Filed Dec. 5, 1958, Ser. No. 778,527
6 Claims. (Cl. 73—490)

The present invention relates generally to accelerometers and more particularly to an accelerometer with velocity and distance integrating means.

The primary object of this invention is to provide an accelerometer having a magnetically suspended acceleration sensing element, free of all mechanical connections, and including additional sensing means cooperating with the accelerometer to indicate velocity and distance as well as acceleration.

Another object of this invention is to provide a double integrating accelerometer in which the acceleration sensing element gives instantaneous indication of acceleration, velocity and position at any given time.

Still another object of this invention is to provide an integrating accelerometer in which the single sensing element has free linear motion in the direction of acceleration and is rotated on its linear axis in proportion to the acceleration force, the spinning motion being used to provide the velocity and distance signals.

A further object of this invention is to provide an accelerometer which will continuously indicate acceleration, velocity and distance in both acceleration and deceleration.

Finally, it is an object to provide an integrating accelerometer of the aforementioned character which is simple to construct, convenient to use and which will give generally efficient and durable service under a wide range of conditions.

Figure 2:
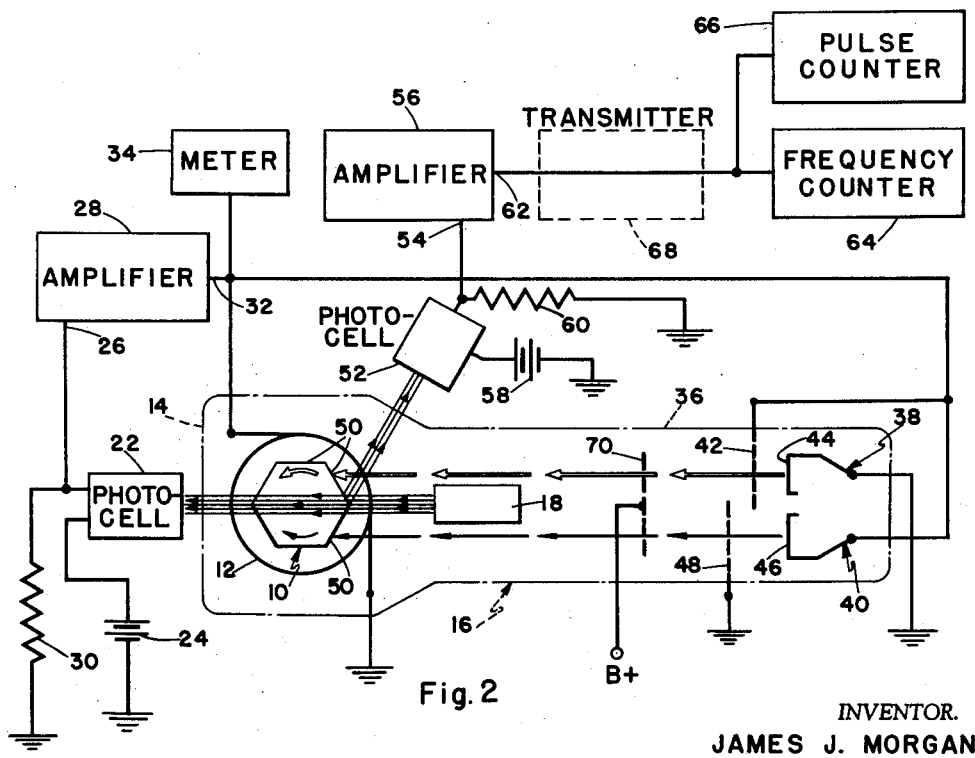

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

FIGURE 1 is a diagrammatic side elevation view of the accelerometer, a portion of the wiring being indicated in block form; and FIGURE 2 is a diagrammatic top plan view of the accelerometer, showing the complete wiring diagram.

Similar characters of reference indicate similar or identical elements and portions throughout the specification and throughout the views of the drawing.

Referring now to the drawing in detail, the accelerometer includes a ferromagnetic sensing element 10 suspended in an electromagnetic field coil 12, the sensing element being supported entirely by the magnetic field and free of all mechanical connections, such a suspension means being described in my copending application Serial No. 778,528, filed of even date herewith. The field coil 12 is enclosed in the bulb portion 14 of an evacuated glass envelope 16, which eliminates air friction and minimizes the effects of environmental variation and disturbances. At one side of the bulb portion 14 is a light source 18, suitably powered by a battery 20 or the like, said light source being positioned to direct a concentrated beam of light diametrically across one end of the sensing element 10. At the other side of the bulb portion 14 is a photoelectric cell 22 positioned to receive the light beam from the source 18, said photoelectric cell being energized by a grounded battery 24. The photoelectric cell 22 is connected to the input 26 of an amplifier 28, which is also connected to ground through a voltage divider resistor 30. The output 32 of amplifier 28 is connected to one end of the field coil 12, the other end of which is grounded, a suitable indicator or meter 34 also being connected to said output.

The envelope 16 has an elongated tube 36 extending radially of the field coil 12, said tube containing a pair of conventional electron guns 38 and 40. The output 32 of amplifier 28 is connected to the grid 42 of electron gun 38, the cathode 44 thereof being grounded, said output also being connected to the cathode 46 of electron gun 40, the grid 48 of which is grounded. Thus both electron guns 38 and 40 are coupled directly to the amplifier 28, one gun being of grounded cathode and the other of grounded grid type. The electron guns 38 and 40 are aligned to direct their electron beams to opposite sides of the sensing element 10 which has a plurality of generally flat faces 50, the sensing element as illustrated being a hexagonal bar, although the exact number of faces is immaterial. The electron beams strike the sensing element 10 substantially tangentially and cause it to rotate, the direction and speed of rotation depending on which electron gun is operating and at what intensity.

Angularly offset to one side of the bulb portion 14 is a second photoelectric cell 52 positioned to receive a portion of the light from the source 18 reflected off the sensing element 10, the flat faces 50 of said sensing element being highly reflective. Thus as the sensing element 10 rotates, each flat face 50 reflects a flash of light to the photoelectric cell 52, which is connected to the input 54 of an amplifier 56. The photoelectric cell 52 is energized by a grounded battery 58 and the input 54 is grounded through a resistor 60. The output 62 of amplifier 56 is connected to a frequency counter 64 and a pulse counter 66. For remote indication purposes, the output 62 may be fed to a suitable transmitter 68, the transmitted signals being picked up by a remote receiver for analysis, such as in a telemetering system.

For descriptive purposes it will be assumed that the accelerometer is installed in a vehicle such as a missile, to provide continuous indication of performance. In operation, the circuit is zeroed so that the voltage across the field coil 12 is sufficient to hold the sensing element 10 suspended with the element obstructing substantially one-half of the light beam from source 18, as in FIGURE 1. This is the neutral position of the accelerometer and the entire circuit is quiescent in this condition, the electron guns 38 and 40 being suitably biased so that no electron beams are produced. When the accelerometer is subjected to an acceleration force, such as during the take-off of the missile in an upward direction in relation to FIGURE 1, the sensing element 10 tends to lag or shift downwardly relative to the field coil 12. This action allows a greater portion of the light beam from source 18 to strike the photoelectric cell 22, so increasing the current flow through the cell to amplifier 28. The increased current is amplified and fed to the field coil 12 to increase the field strength and restrain the sensing element 10 against further movement. Only linear or axial motion of the sensing element 10 causes any action and the accelerometer is not affected by side loads or vibration. It will be evident that the voltage across the field coil 12 is directly proportional to the acceleration, since the voltage is a direct result of the output of photoelectric cell 22 suitably amplified to provide a usable current. This may be expressed by the formula $$M\bar{A} = \frac{CANi}{l}$$

where M is the mass of the sensing element, $\bar{A}$ is the acceleration, C is a constant depending on the coil, A is the surface area of the sensing element, N is the number of turns of wire in the coil, $i$ is the current through the coil and $l$ is the length of the coil. However, M, C, A, N and $l$ are constants, so the formula may be rewritten as $\bar{A} = Ki$ where K is a constant. By Ohm's law the voltage V is proportional to the current, so that $\bar{A}=KV$. The voltage across the coil is measured by the meter 34, which can be calibrated in terms of acceleration to provide a direct reading.

The amplifier output 32 is also connected to the electron guns 38 and 40, and thus the increased voltage caused by acceleration energizes the guns. If the voltage is positive compared to the quiescent state, the grounded grid electron gun 40 will be cut off and no electrons will flow. But the positive voltage applied to the grid 42 of electron gun 38 will cause the cathode 44 to emit a stream of electrons which strike the sensing element 10 and cause it to rotate in a counter-clockwise direction, as indicated by the outlined directional arrows in FIGURE 2. Of course, if the voltage is negative compared to the quiescent state, the electron gun 40 will operate and spin the sensing element 10 in a clockwise direction, as indicated by the solid directional arrows, this being as a result of deceleration, or acceleration in the opposite direction. An accelerator grid 70 may be included in the electron gun assembly if necessary to increase the efficiency of the system, the design of such electron gun apparatus being well known.

The output of the electron gun 38 is directly proportional to the output voltage provided by the amplifier 28, which is proportional to the acceleration. Therefore, the electron gun output is also directly proportional to the acceleration. The torque applied to the sensing element 10 may be expressed by the formula $T = v \times Mc \times R \times N$ where T is the torque, $v$ is the velocity of the electrons, Mc is the mass of an electron, R is the radial distance from the sensing element axis to the electron impact point and N is the number of electrons per second striking the sensing element. Now $v$, Mc and R are constant and may be expressed by the product $C_2$, so that $T=C_2N$. However, the number of electrons per second N is proportional to the voltage V, which is proportional to the acceleration $\bar{A}$ and the formula may be reduced to $T=\bar{A}$ or torque=acceleration. The torque on a freely rotatable mass such as the sensing cylinder 10 is equal to $I\alpha$, where I is the moment of inertia of the mass and $\alpha$ is the angular acceleration. Torque T is equal to acceleration $\bar{A}$, so $\bar{A}=I\alpha$. I is a constant and for simplicity may be assumed to be unity, the formula then being written as $\bar{A}=\alpha$. To obtain velocity this last formula is integrated with respect to time, between the limits of zero time $t_0$ and a point of time $t_1$ at which readings are required. From the integration $$\int_{t_0}^{t_1} \bar{A} \, dt = \int_{t_0}^{t_1} \alpha \, dt$$

we get Vel=$\omega$ where Vel is the velocity of the missile and $\omega$ is the rotational speed of the sensing element 10. As the sensing element 10 rotates, each flat face 50 reflects a flash of light to the photoelectric cell 52, the resultant pulses of increased output voltage being amplified and fed to the frequency counter 64, which provides an indication of rotational speed in revolutions per minute or any other increments. The frequency counter 64 may be set up to indicate velocity directly or this may be calculated from the rotational frequency.

By further integration it is possible to find the instantaneous position of the missile or the distance travelled. The formula Vel=$\omega$ is integrated with respect to time within the same limits $t_0$ and $t_1$, since both integrations actually take place simultaneously and continuously, the formula being $$\int_{t_0}^{t_1} \text{Vel} \, dt = \int_{t_0}^{t_1} \omega \, dt$$

or $X=\theta$ where X is the distance travelled and $\theta$ is the total angle of revolution of the sensing element. The total angle is obtained from the pulse counter 64 which counts the actual number of revolutions of the sensing element 10.

Thus the accelerometer uses a single, freely suspended sensing element to detect acceleration, the acceleration signal being utilized to spin the sensing element in direct proportion to the acceleration. The rotational speed and number of revolutions of the sensing element provide indication of velocity and distance travelled. All of the functions are continuous, so that the acceleration, speed and position are known at any instant. In the case of a missile, the various signals can be telemetered to a receiving station by the transmitter 68, while in a manned vehicle, direct reading instruments or recording devices can be used.

While the device is primarily intended for use as an accelerometer, the sensing element 10 may be subjected to other influences and the circuit used to integrate various functions which can be obtained in the form of a voltage. Also noteworthy is the fact that the output is digital and the circuit is compatible with conventional digital computers.

The operation of this invention will be clearly comprehended from a consideration of the foregoing description of the mechanical details thereof, taken in connection with the above recited objects and drawings. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:

1. In an accelerometer system: an electromagnetic field coil; a ferromagnetic sensing element suspended in and entirely supported by the magnetic field of said coil; detecting means sensitive to linear motion of said sensing element; a source of voltage connected through said detecting means to said coil, whereby the voltage in said coil varies in proportion to the motion of said sensing element; a beam source of electrons mounted adjacent said sensing element and aligned to direct a beam of electrons against the sensing element at one side of the axis thereof to cause rotation of the sensing element; said electron source being operatively connected to said coil, whereby the electron beam intensity varies proportionally with the voltage in the coil; and spin measuring means operatively mounted adjacent said sensing element to indicate the rotational speed of the element.

2. In an accelerometer system: an electromagnetic field coil; a ferromagnetic sensing element suspended in and entirely supported by the magnetic field of said coil; detecting means sensitive to linear motion of said sensing element; a source of voltage connected through said detecting means to said coil, whereby the voltage in said coil varies in proportion to the motion of said sensing element; a pair of electron guns mounted adjacent said sensing element and positioned to direct parallel electron beams to strike the sensing element on opposite sides of the axis thereof; said electron guns being operatively connected to said coil, whereby the electron beam intensity varies proportionally with the voltage in the coil; said electron guns being connected in opposite polarity so that each gun operates individually to cause rotation of the sensing element in either direction according to the polarity of the voltage in said coil; an evacuated sealed envelope enclosing said electron guns, said coil and said sensing element; and spin measuring means operatively mounted adjacent said sensing means to indicate the rotational speed of the element.

3. In an accelerometer system: an electromagnetic field coil; a ferromagnetic sensing element suspended in and entirely supported by the magnetic field of said coil; detecting means sensitive to linear motion of said sensing element; a source of voltage connected through said detecting means to said coil, whereby the voltage in said coil varies in proportion to the motion of said sensing element; a pair of electron guns mounted adjacent said sensing element and positioned to direct parallel electron beams to strike the sensing element on opposite sides of the axis thereof; said electron guns being operatively connected to said coil, whereby the electron beam intensity varies proportionally with the voltage in the coil; said electron guns being connected in opposite polarity so that each gun operates individually to cause rotation of the sensing element in either direction according to the polarity of the voltage in said coil; an evacuated sealed envelope enclosing said electron guns, said coil and said sensing element; spin measuring means operatively mounted adjacent said sensing means to measure the rotational speed of the sensing element; and counting means coupled to said spin measuring means to indicate the total number of revolutions of said sensing element.

4. In an accelerometer system: an electromagnetic field coil; a ferromagnetic sensing element suspended in and entirely supported by the magnetic field in said coil; a light source mounted adjacent said sensing element to direct a beam of light transversely across one end of the element and positioned so that a portion of the beam is obstructed when the element is in a neutral position; a photoelectric cell positioned to receive the light beam from said source; a source of voltage connected through said photoelectric cell to said coil, whereby the voltage in the coil varies in proportion to the energization of the photoelectric cell by the light beam; a pair of electron guns mounted adjacent said sensing element and positioned to direct parallel electron beams to strike the sensing element on opposite sides of the axis thereof; said electron guns being operatively connected to said coil, whereby the electron beam intensity varies proportionally with the voltage in the coil; said electron guns being connected in opposite polarity so that each gun operates individually to cause rotation of the sensing element in either direction according to the polarity of the voltage in said coil; an evacuated sealed envelope enclosing said electron guns, said coil and said sensing element; spin measuring means operatively mounted adjacent said sensing means to measure the rotational speed of the sensing element; and counting means coupled to said spin measuring means to indicate the total number of revolutions of said sensing element.

5. In an accelerometer system: an electromagnetic field coil; a ferromagnetic sensing element suspended in and entirely supported by the magnetic field in said coil; a light source mounted adjacent said sensing element to direct a beam of light transversely across one end of the element and positioned so that a portion of the beam is obstructed when the element is in a neutral position; a photoelectric cell positioned to receive the light beam from said source; a source of voltage connected through said photoelectric cell to said coil, whereby the voltage in the coil varies in proportion to the energization of the photoelectric cell by the light beam; a pair of electron guns mounted adjacent said sensing element and positioned to direct parallel electron beams to strike the sensing element on opposite sides of the axis thereof; said electron guns being operatively connected to said coil, whereby the electron beam intensity varies proportionally with the voltage in the coil; said electron guns being connected in opposite polarity so that each gun operates individually to cause rotation of the sensing element in either direction according to the polarity of the voltage in said coil; an evacuated sealed envelope enclosing said electron guns, said coil and said sensing element; said sensing element having a plurality of facets thereon at the end obstructing the light beam; a second photoelectric cell operatively mounted adjacent said sensing element and positioned to receive flashes of light reflected by said facets as the sensing element rotates; and measuring means connected to said second photoelectric cell to indicate the frequency and number of flashes.

6. An accelerometer system according to claim 5 and wherein said measuring means includes a frequency counter adapted to indicate the rotational speed of said sensing element; and a pulse counter to record the total number of revolutions of said sensing element.

References Cited in the file of this patent
UNITED STATES PATENTS

| | | |
|---|---|---|
| 2,498,997 | McLean | Feb. 28, 1950 |
| 2,691,306 | Beams et al. | Oct. 12, 1954 |
| 2,805,373 | Bonnell | Sept. 3, 1957 |
| 2,819,053 | Pope | Jan. 7, 1958 |
| 2,856,238 | Dacus | Oct. 14, 1958 |
| 2,882,034 | Wuerth | Apr. 14, 1959 |
| 2,919,583 | Parker | Jan. 5, 1960 |